(12) United States Patent
Walker

(10) Patent No.: US 10,908,823 B2
(45) Date of Patent: Feb. 2, 2021

(54) DATA TRANSFER FOR WEAR LEVELING WITH BANK CLUSTERS

(71) Applicant: Micron Technology, Inc., Boise, ID (US)

(72) Inventor: Robert M. Walker, Raleigh, NC (US)

(73) Assignee: Micron Technology, Inc., Boise, ID (US)

(*) Notice: Subject to any disclaimer, the term of this patent is extended or adjusted under 35 U.S.C. 154(b) by 16 days.

(21) Appl. No.: 16/159,074

(22) Filed: Oct. 12, 2018

(65) Prior Publication Data

US 2020/0117370 A1   Apr. 16, 2020

(51) Int. Cl.
*G06F 3/06* (2006.01)
*G06F 12/02* (2006.01)

(52) U.S. Cl.
CPC .......... *G06F 3/0616* (2013.01); *G06F 3/0647* (2013.01); *G06F 3/0658* (2013.01); *G06F 3/0659* (2013.01); *G06F 3/0673* (2013.01); *G06F 12/0246* (2013.01); *G06F 2212/1036* (2013.01)

(58) Field of Classification Search
CPC .... G06F 3/0616; G06F 3/0647; G06F 3/0658; G06F 3/0659; G06F 3/0673; G06F 12/0246; G06F 2212/1036
See application file for complete search history.

(56) References Cited

U.S. PATENT DOCUMENTS

| | | | | |
|---|---|---|---|---|
| 3,705,388 A | * | 12/1972 | Nishimoto | G06F 12/0859 711/118 |
| 10,198,371 B2 | * | 2/2019 | Noda | G06F 13/1673 |
| 2002/0105853 A1 | * | 8/2002 | Naven | G06F 12/0607 365/189.011 |
| 2009/0089485 A1 | * | 4/2009 | Yeh | G06F 12/0246 711/103 |
| 2010/0250793 A1 | * | 9/2010 | Syu | G11C 7/22 710/29 |
| 2012/0079175 A1 | * | 3/2012 | Flynn | G11C 7/1012 711/103 |

* cited by examiner

*Primary Examiner* — Tasnima Matin
(74) *Attorney, Agent, or Firm* — Holland & Hart LLP

(57) ABSTRACT

Methods, systems, and devices for data transfer for wear-leveling are described. Data may be stored in pages of banks and the banks may be grouped into bank clusters. A host device may address one bank of a bank cluster at a time. Data may be transferred from a bank to a buffer or a different bank cluster for wear-leveling purposes and this data transfer may take place opportunistically while a second bank, which may be in the same bank cluster, is being accessed based on an access command.

19 Claims, 11 Drawing Sheets

(1)

DATA TRANSFER FOR WEAR LEVELING WITH BANK CLUSTERS

BACKGROUND

The following relates generally to a system that includes at least one memory device and more specifically to data transfer for wear-leveling.

Memory devices are widely used to store information in various electronic devices such as computers, wireless communication devices, cameras, digital displays, and the like. Information is stored by programing different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state over time unless they are periodically refreshed by an external power source. FeRAM may use similar device architectures as volatile memory but may have non-volatile properties due to the use of a ferroelectric capacitor as a storage device. FeRAM devices may thus have improved performance compared to other non-volatile and volatile memory devices.

Improving memory devices, generally, may include increasing memory cell density, increasing read/write speeds, increasing reliability, increasing data retention, reducing power consumption, reducing manufacturing costs, or increasing the lifetime of the memory device among other metrics. The performance of some memory devices may degrade over time due to changes in the memory device that occur due to use (e.g., cell imprint or other effects). The reduction in performance of the memory device may be caused by any quantity of issues including storing the same state for long periods of time, writing to one memory array more than other memory arrays, or even normal usage. The reduction in performance of the memory device may affect the expected lifetime of the memory device. Improved wear-leveling techniques may be used to increase the endurance or lifetime of a memory device.

DETAILED DESCRIPTION

Figure 1:
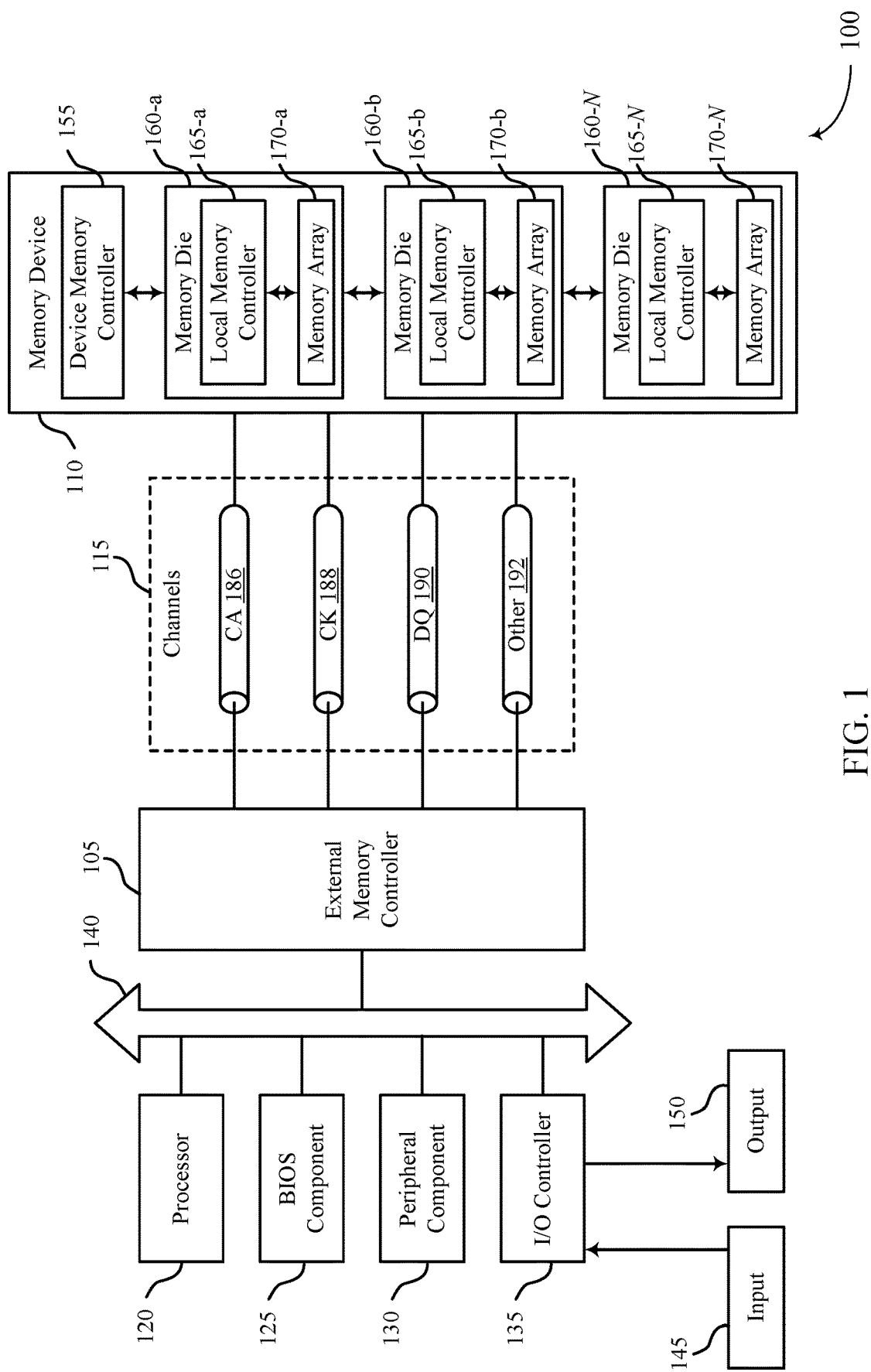
FIG. 1 illustrates an example of a system for data transfer for wear-leveling as disclosed herein.

Some types of memory devices (e.g., ferroelectric memory devices) may experience stress or fatigue that affects the performance of those memory devices over time. For example, ferroelectric memory cells may experience imprint if the memory cell stores a single value for extended durations, which may increase an error rate associated with the memory cell over time. Improving the lifetime of a memory device may be achieved through improved wear-leveling. Wear-leveling may include transferring data from location to location, which may prevent one memory bank of a memory device from being accessed (e.g., written) significantly more times than other memory banks, which would otherwise decrease the lifetime of the overused memory bank compared to a memory bank that is written fewer times. Improved wear-leveling may protect the memory device against unintentional overuse of memory banks that may otherwise cause portions of the memory bank to prematurely fail, to experience higher error rates, or other degraded performance.

A memory device may transfer data (e.g., periodically) to provide some form of wear-leveling of a memory cell or memory bank. The terms memory banks and banks may be referred to interchangeably herein. Data migration operations that transfer data for wear-leveling may, however, affect the overall performance of the memory device by using resources (e.g., access periods) to move data that are not directly related to the operations of a host device coupled with the memory device.

To reduce impacts on the performance of the memory device, as measured from the perspective of a host device, the memory device may opportunistically transfer data for wear-leveling purposes concurrent with the host device accessing data for its operations. In this manner, the data migration operations may in some cases occur at the same time that access operations for the host device occur in the memory device. To do this, banks of the memory device may be grouped into bank clusters. A host device may be capable of accessing one bank at a time within the bank cluster as part of an access operation. The memory device may access other banks of the bank cluster during an access period associated with the access operation to perform data migration operations. The banks may be configured to store data in the pages of the bank and the data may be transferred from bank to bank (e.g., within a bank cluster), from a bank of a first bank cluster to a bank of a second bank cluster (e.g., via a buffer), or from a first bank of a first bank cluster to a second bank of the first bank cluster (e.g., via a buffer), among other alternatives.

In one example, data may be transferred from a first bank of a first bank cluster to a second bank of the first bank cluster during an access period of an access operation (e.g., initiated by a host device). In some cases, commands for transferring the data and/or the data to be transferred may be waiting for the host device to cause a bank of a bank cluster to be accessed.

Figure 2:
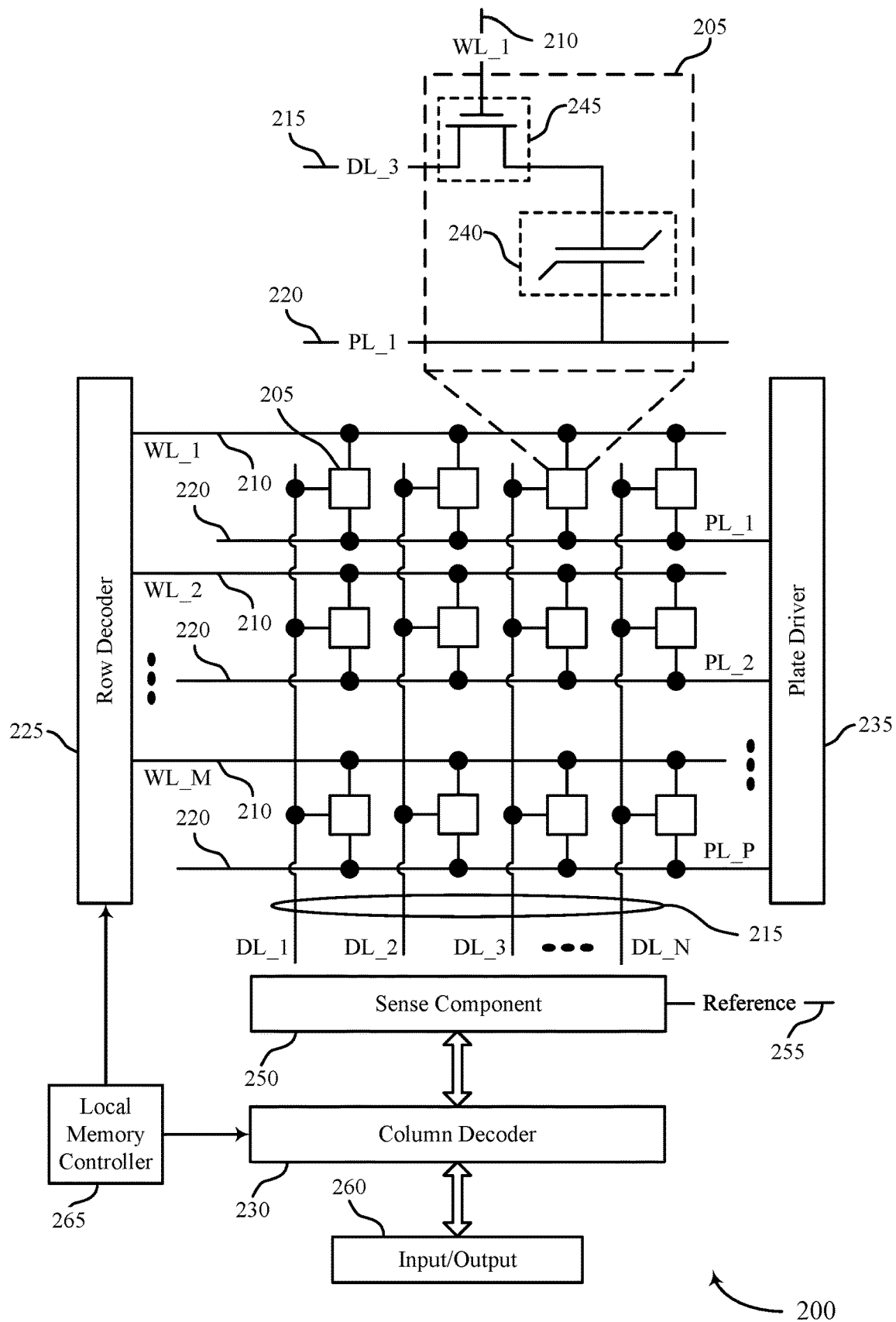
FIG. 2 illustrates an example of a memory die that supports data transfer for wear-leveling as disclosed herein.

Features of the disclosure are initially described in the context of a memory system in FIGS. 1 and 2. Features of the disclosure are described in the context memory systems, circuits, and flow diagrams in FIGS. 3 through 6. These and other features of the disclosure are further illustrated by and described with reference to FIGS. 7 through 11 that include apparatus diagrams, system diagrams, and flowcharts that relate to data transfer for wear-leveling.

FIG. 1 illustrates an example of a system 100 that utilizes one or more memory devices in accordance with aspects disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include aspects of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be component of the system configured to store data for one or more other components of the system 100. In some examples, the system 100 is configured for bi-directional wireless communication with other systems or devices using a base station or access point. In some examples, the system 100 is capable of machine-type communication (MTC), machine-to-machine (M2M) communication, or device-to-device (D2D) communication.

At least portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, or the like. In some cases, the host device may refer to the hardware, firmware, software, or a combination thereof that implements the functions of the external memory controller 105. In some cases, the external memory controller 105 may be referred to as a host or host device.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as a multi-chip memory or package).

The system 100 may further include a processor 120, a basic input/output system (BIOS) component 125, one or more peripheral components 130, and an input/output (I/O) controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or accelerated graphics port (AGP) slots. The peripheral component(s) 130 may be other components understood by those skilled in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input 145 may represent a device or signal external to the system 100 that provides information, signals, or data to the system 100 or its components. This may include a user interface or interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor on printed circuit board, and so forth. In some cases, the output 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein.

The memory device 110 may include a device memory controller 155 and one or more memory dice 160. Each memory die 160 may include a local memory controller 165 (e.g., local memory controller 165-a, local memory controller 165-b, and/or local memory controller 165-N) and a memory array 170 (e.g., memory array 170-a, memory array 170-b, and/or memory array 170-N). In some examples, a device memory controller 155 of a memory device 110 may determine that a data migration operation associated with a memory array 170 is waiting to be performed. The device memory controller 155 may cause the memory device 110 to transfer data from a first location to a different location according to the data migration operation as discussed in further detail herein. A memory array 170 may be a collection (e.g., a grid) of memory cells, with each memory cell being configured to store at least one bit of digital data. Features of memory arrays 170 and/or memory cells are described in more detail with reference to FIG. 2. Memory devices may additionally include banks, which may be grouped into bank clusters. The banks may be coupled with other banks in the same bank cluster and bank clusters may be coupled with buffers. Additionally, a first bank in a first bank cluster may be coupled with a buffer, and the buffer may be coupled with a second bank, also in the first bank cluster.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dice 160 (e.g., memory die 160-a, memory die 160-b, and/or any quantity of memory dice 160-N). In a 3D memory device, a plurality of memory dice 160-N may be stacked on top of one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs or increase the performance of the memory array, or both. In some 3D memory device, different decks may share at least one common access line such that some decks may share at least one of a word line, a digit line, and/or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120. In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. In some examples, the device memory controller 155 may receive access commands from a host device to access data stored in a bank of a bank cluster in the memory device and during an access period. Additionally, during the access period data may be opportunistically transferred from a first location to a different location according to a data migration operation which will be discussed in detail herein. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 as described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120. As previously discussed, the device memory controller 155 may receive access commands from a host device to access data stored in a bank of a bank cluster in the memory device and during an access period. Additionally, during the access period data may be opportunistically transferred from a first location to a different location. The local memory controllers 165 (e.g., 165-a, 165-b, 163-N) may transfer the data from the first location to a different location according to commands received from the device memory controller 155. In some cases, the local memory controllers 165 may receive the access commands and may initiate the data migration commands based on the host device causing bank clusters to be accessed.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel. In some cases, a pin or pad of a terminal may be part of to a signal path of the channel 115. Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170).

Channels 115 (and associated signal paths and terminals) may be dedicated to communicating specific types of information. In some cases, a channel 115 may be an aggregated channel and thus may include multiple individual channels. For example, a data channel 190 may be ×4 (e.g., including four signal paths), ×8 (e.g., including eight signal paths), ×16 (including sixteen signal paths), and so forth.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include eight or nine signal paths.

In some cases, the channels 115 may include one or more data (DQ) channels 190. The data channels 190 may be configured to communicate data and/or control information between the external memory controller 105 and the memory device 110. For example, the data channels 190 may communicate information (e.g., bi-directional) to be written to the memory device 110 or information read from the memory device 110. The data channels 190 may communicate signals that may be modulated using a variety of different modulation schemes (e.g., NRZ, PAM4).

In some cases, the channels 115 may include one or more other channels 192 that may be dedicated to other purposes. These other channels 192 may include any quantity of signal paths. The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Wear-leveling techniques may include transferring data from one location to a different location, which may prevent memory cell imprint and other effects that may decrease the performance of the memory. Wear-leveling may protect the memory device against unintentional overuse of memory banks which may cause the memory bank to prematurely fail, to see a reduction in performance, or an increase in an error rate.

In some examples, transferring data for wear-leveling may cause some latency in the memory system because the memory system may have to perform operations that are not related to the operation of the host device associated with the memory device. In some examples, the data transfer for a data migration operation may opportunistically take place while a host device is accessing the bank cluster, thus reducing the latency of the memory system.

Data transfer for wear-leveling may achieve distributing the wear more evenly between the memory banks or memory cells within a memory array. Banks may be grouped into bank clusters and the banks of a bank cluster may be accessed by a host device one bank at a time within the bank cluster. The banks may be configured to store data in the pages of the bank and the data may be transferred from bank to bank within a bank cluster or from a bank of a first bank cluster to a bank of a second bank cluster. The data may be transferred to avoid a bank from being overused. Additionally, the data may be opportunistically transferred during an access period and while the host device accesses the same bank cluster.

In various examples in accordance with the present disclosure data may be transferred between banks of the same bank cluster, data may be transferred from a first bank cluster to a second bank cluster via a buffer, and data may be transferred from a first bank of a first bank cluster to a second bank of the first bank cluster via the buffer where the buffer may also be in the first bank cluster.

FIG. 2 illustrates an example of a memory die 200 in accordance with various examples of the present disclosure. The memory die 200 may be an example of the memory dice 160 described with reference to FIG. 1. In some cases, the memory die 200 may be referred to as a memory chip, a memory device, or an electronic memory apparatus. The memory die 200 may include one or more memory cells 205 that are programmable to store different logic states. Each memory cell 205 may be programmable to store two or more states. For example, the memory cell 205 may be configured to store one bit of digital logic at a time (e.g., a logic 0 and a logic 1). In some cases, a single memory cell 205 (e.g., a multi-level memory cell) may be configured to store more than one bit of digit logic at a time (e.g., a logic 00, logic 01, logic 10, or a logic 11).

A memory cell 205 may store a state (e.g., polarization state or dielectric charge) that represents digital data. In FeRAM architectures, the memory cell 205 may include a capacitor that includes a ferroelectric material to store a charge and/or a polarization representative of the programmable state. In DRAM architectures, the memory cell 205 may include a capacitor that includes a dielectric material to store a charge representative of the programmable state.

Operations such as reading and writing may be performed on memory cells 205 by activating or selecting access lines such as a word line 210, a digit line 215, and/or a plate line 220. In some cases, digit lines 215 may also be referred to as bit lines. References to access lines, word lines, digit lines, plate lines or their analogues, are interchangeable without loss of understanding or operation. Activating or selecting a word line 210, a digit line 215, or a plate line 220 may include applying a voltage to the respective line.

The memory die 200 may include the access lines (e.g., the word lines 210, the digit lines 215, and the plate lines 220) arranged in a grid-like pattern. Memory cells 205 may be positioned at intersections of the word lines 210, the digit lines 215, and/or the plate lines 220. By biasing a word line 210, a digit line 215, and a plate line 220 (e.g., applying a voltage to the word line 210, digit line 215, or plate line 220), a single memory cell 205 may be accessed at their intersection.

Accessing the memory cells 205 may be controlled through a row decoder 225, a column decoder 230, and a plate driver 235. For example, a row decoder 225 may receive a row address from the local memory controller 265 and activate a word line 210 based on the received row address. A column decoder 230 receives a column address from the local memory controller 265 and activates a digit line 215 based on the received column address. A plate driver 235 may receive a plate address from the local memory controller 265 and activates a plate line 220 based on the received plate address. For example, the memory die 200 may include multiple word lines 210, labeled WL_1 through WL_M, multiple digit lines 215, labeled DL_1 through DL_N, and multiple plate lines, labeled PL_1 through PL_P, where M, N, and P depend on the size of the memory array. Thus, by activating a word line 210, a digit line 215, and a plate line 220, e.g., WL_1, DL_3, and PL_1, the memory cell 205 at their intersection may be accessed. The intersection of a word line 210 and a digit line 215, in either a two-dimensional or three-dimensional configuration, may be referred to as an address of a memory cell 205. In some cases, the intersection of a word line 210, a digit line 215, and a plate line 220 may be referred to as an address of the memory cell 205.

The memory cell 205 may include a logic storage component, such as capacitor 240, and a switching component 245. The capacitor 240 may be an example of a ferroelectric capacitor. A first node of the capacitor 240 may be coupled with the switching component 245 and a second node of the capacitor 240 may be coupled with a plate line 220. The switching component 245 may be an example of a transistor or any other type of switch device that selectively establishes or de-establishes electronic communication between two components.

Selecting or deselecting the memory cell 205 may be accomplished by activating or deactivating the switching component 245. The capacitor 240 may be in electronic communication with the digit line 215 using the switching component 245. For example, the capacitor 240 may be isolated from digit line 215 when the switching component 245 is deactivated, and the capacitor 240 may be coupled with digit line 215 when the switching component 245 is activated. In some cases, the switching component 245 is a transistor and its operation is controlled by applying a voltage to a transistor gate, where the voltage differential between the transistor gate and transistor source is greater or less than a threshold voltage of the transistor. In some cases, the switching component 245 may be a p-type transistor or an n-type transistor. The word line 210 may be in electronic communication with the gate of the switching component 245 and may activate/deactivate the switching component 245 based on a voltage being applied to word line 210.

A word line 210 may be a conductive line in electronic communication with a memory cell 205 that is used to perform access operations on the memory cell 205. In some architectures, the word line 210 may be in electronic communication with a gate of a switching component 245 of a memory cell 205 and may be configured to control the switching component 245 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 250. In some architectures, the memory cell 205 may be selectively coupled with the digit line 215 during portions of an access operation. For example, the word line 210 and the switching component 245 of the memory cell 205 may be configured to selected couple and/or isolate the capacitor 240 of the memory cell 205 and the digit line 215. In some architectures, the memory cell 205 may be in electronic communication (e.g., constant) with the digit line 215.

A plate line 220 may be a conductive line in electronic communication with a memory cell 205 that is used to perform access operations on the memory cell 205. The plate line 220 may be in electronic communication with a node (e.g., the cell bottom) of the capacitor 240. The plate line 220 may be configured to cooperate with the digit line 215 to bias the capacitor 240 during access operation of the memory cell 205.

The sense component 250 may be configured to detect a state (e.g., a polarization state or a charge) stored on the capacitor 240 of the memory cell 205 and determine a logic state of the memory cell 205 based on the detected state. The charge stored by a memory cell 205 may be extremely small, in some cases. As such, the sense component 250 may include one or more sense amplifiers to amplify the signal output of the memory cell 205. The sense amplifiers may detect minute changes in the charge of a digit line 215 during a read operation and may produce signals corresponding to either a logic 0 or a logic 1 based on the detected charge. During a read operation, the capacitor 240 of memory cell 205 may output a signal (e.g., discharge a charge) to its corresponding digit line 215. The signal may cause a voltage of the digit line 215 to change. The sense component 250 may be configured to compare the signal received from the memory cell 205 across the digit line 215 to a reference signal 255 (e.g., a reference voltage). The sense component 250 may determine the stored state of the memory cell 205 based on the comparison. For example, in binary-signaling, if digit line 215 has a higher voltage than the reference signal 255, the sense component 250 may determine that the stored state of memory cell 205 is a logic 1, and, if the digit line 215 has a lower voltage than the reference signal 255, the sense component 250 may determine that the stored state of the memory cell 205 is a logic 0. The sense component 250 may include various transistors or amplifiers to detect and amplify a difference in the signals. The detected logic state of memory cell 205 may be output through column decoder 230 as output 260. In some cases, the sense component 250 may be part of another component (e.g., a column decoder 230, row decoder 225). In some cases, the sense component 250 may be in electronic communication with the row decoder 225, the column decoder 230, and/or the plate driver 235. In some examples, a sense component may be a buffer for temporary data storage during a data migration operation.

Data may be transferred periodically to mitigate the effects that storing data within a memory cell too long may have on the performance of the memory cell (e.g., imprint). The data may be transferred from a first bank of a first bank cluster to a buffer while a second bank of the first bank cluster is being accessed by a host device. The data transfer may opportunistically take place during this access period. The data may be temporarily stored in the buffer until a bank of a destination bank cluster is accessed in response to receiving an access command from the host device. The data associated with a data migration command may be transferred from the buffer to a non-accessed bank of the destination bank cluster.

The local memory controller 265 may control the operation of memory cells 205 through the various components (e.g., row decoder 225, column decoder 230, plate driver 235, and sense component 250). The local memory controller 265 may be an example of the local memory controller 165 described with reference to FIG. 1. In some cases, one or more of the row decoder 225, column decoder 230, and plate driver 235, and sense component 250 may be co-located with the local memory controller 265. The local memory controller 265 may be configured to receive one or more commands and/or data from an external memory controller 105 (or a device memory controller 155 described with reference to FIG. 1), translate the commands and/or data into information that can be used by the memory die 200, perform one or more operations on the memory die 200, and communicate data from the memory die 200 to the external memory controller 105 (or the device memory controller 155) in response to performing the one or more operations. The local memory controller 265 may generate row, column, and/or plate line address signals to activate the target word line 210, the target digit line 215, and the target plate line 220. The local memory controller 265 may also generate and control various voltages or currents used during the operation of the memory die 200. In general, the amplitude, shape, or duration of an applied voltage or current discussed herein may be adjusted or varied and may be different for the various operations discussed in operating the memory die 200. In some examples, the device memory controller 155, a local memory controller 165, or a local memory controller 265 (as described with reference to FIGS. 1 and 2) may receive access commands from a host device to access data stored in a bank of a bank cluster in the memory device and during an access period. Additionally, during the access period data may be opportunistically transferred from a first location to a different location. In some cases, the local memory controllers 165 or 265 as described with reference to FIGS. 1 and 2, may transfer the data from the first location to a different location according to commands received from the device memory controller 155.

In some cases, the local memory controller 265 may be configured to perform a write operation (e.g., a programming operation) on one or more memory cells 205 of the memory die 200. During a write operation, a memory cell 205 of the memory die 200 may be programmed to store a desired logic state. In some cases, a plurality of memory cells 205 may be programmed during a single write operation. The local memory controller 265 may identify a target memory cell 205 on which to perform the write operation. The local memory controller 265 may identify a target word line 210, a target digit line 215, and/or a target plate line 220 in electronic communication with the target memory cell 205 (e.g., the address of the target memory cell 205). The local memory controller 265 may activate the target word line 210, the target digit line 215, and/or the target plate line 220 (e.g., applying a voltage to the word line 210, digit line 215, or the plate line 220), to access the target memory cell 205. The local memory controller 265 may apply a specific signal (e.g., voltage) to the digit line 215 and a specific signal (e.g., voltage) to the plate line 220 during the write operation to store a specific state in the capacitor 240 of the memory cell 205, the specific state being indicative of a desired logic state.

In some cases, the local memory controller 265 may be configured to perform a read operation (e.g., a sense operation) on one or more memory cells 205 of the memory die 200. During a read operation, the logic state stored in a memory cell 205 of the memory die 200 may be determined. In some cases, a plurality of memory cells 205 may be sensed during a single read operation. The local memory controller 265 may identify a target memory cell 205 on which to perform the read operation. The local memory controller 265 may identify a target word line 210, a target digit line 215, and/or a target plate line 220 in electronic communication with the target memory cell 205 (e.g., the address of the target memory cell 205). The local memory controller 265 may activate the target word line 210, the target digit line 215, and/or a target plate line 220 (e.g., applying a voltage to the word line 210, the digit line 215, or the plate line 220), to access the target memory cell 205. The target memory cell 205 may transfer a signal to the sense component 250 in response to biasing the access lines. The sense component 250 may amplify the signal. The local memory controller 265 may fire the sense component 250 (e.g., latch the sense component) and thereby compare the signal received from the memory cell 205 to the reference signal 255. Based on that comparison, the sense component 250 may determine a logic state that is stored on the memory cell 205. The local memory controller 265 may communicate the logic state stored on the memory cell 205 to the external memory controller 105 (or the device memory controller) as part of the read operation.

Figure 3:
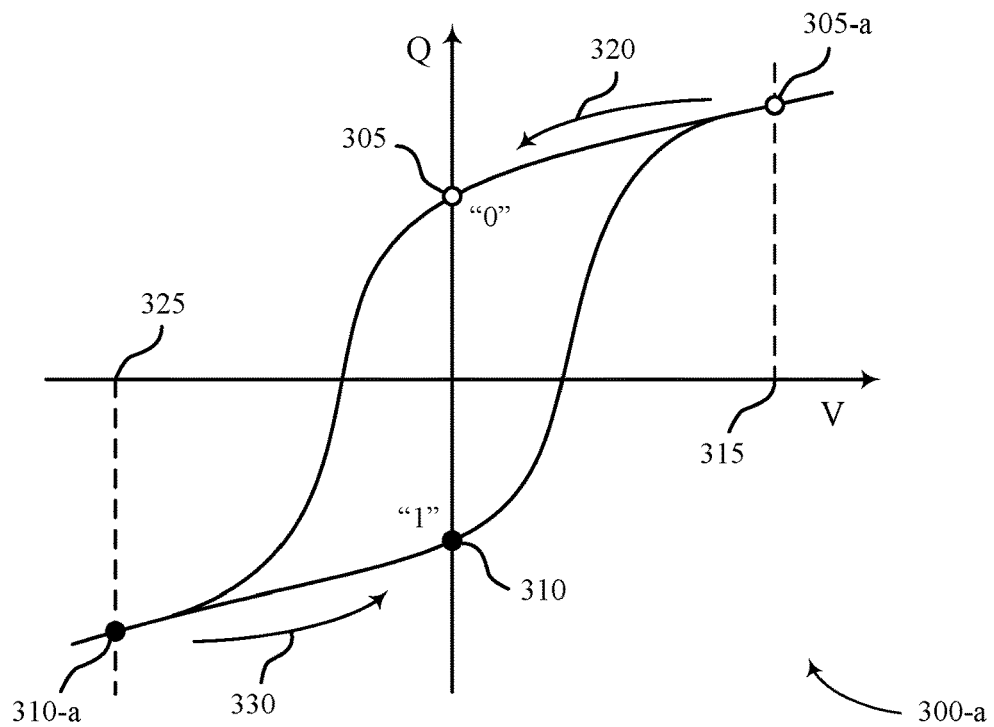
FIG. 3 illustrates examples of hysteresis curves that support data transfer for wear-leveling in accordance with examples of the present disclosure
Figure 3:
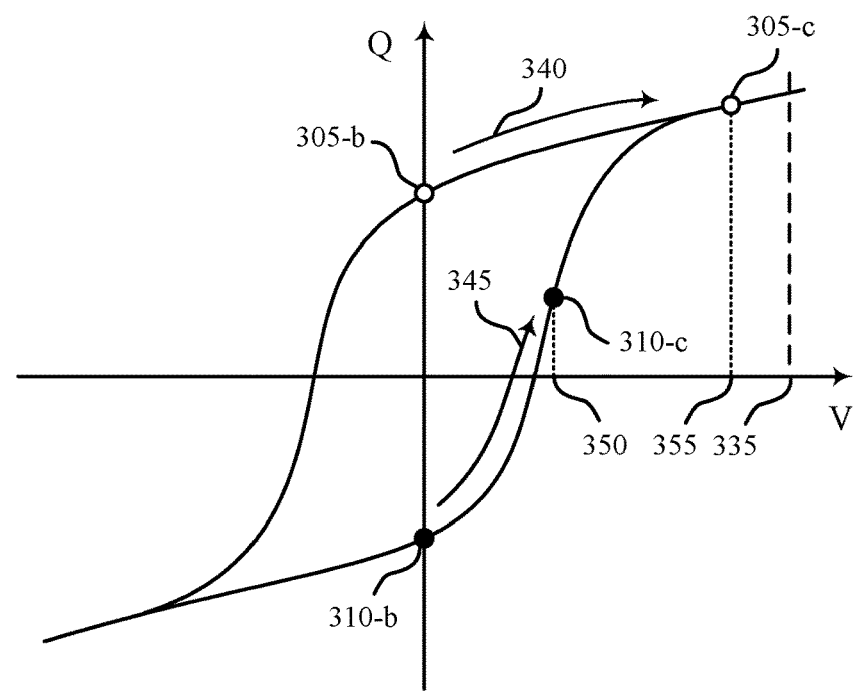

FIG. 3 illustrates examples of non-linear electrical properties of a ferroelectric memory cell with hysteresis curves 300-a and 300-b in accordance with various examples of the present disclosure. Hysteresis curves 300-a and 300-b illustrate an example ferroelectric memory cell writing and reading process, respectively. Hysteresis curves 300-a and 300-b depict the charge, Q, stored on a ferroelectric capacitor (e.g., capacitor 240 described with reference to FIG. 2) as a function of a voltage difference, V.

A ferroelectric material is characterized by a spontaneous electric polarization, that is, it maintains a non-zero electric polarization in the absence of an electric field. Example ferroelectric materials include barium titanate (BaTiO3), lead titanate (PbTiO3), lead zirconium titanate (PZT), and strontium bismuth tantalate (SBT). The ferroelectric capacitors described herein may include these or other ferroelectric materials. Electric polarization within a ferroelectric capacitor results in a net charge at the ferroelectric material's surface and attracts opposite charge through the capacitor terminals. Thus, charge is stored at the interface of the ferroelectric material and the capacitor terminals. Because the electric polarization may be maintained in the absence of an externally applied electric field for relatively long times, even indefinitely, charge leakage may be significantly decreased as compared with, for example, capacitors employed in DRAM arrays. This may reduce the need to perform refresh operations.

Hysteresis curves 300-a and 300-b may be understood from the perspective of a single terminal of a capacitor. By way of example, if the ferroelectric material has a negative polarization, positive charge accumulates at the terminal. Likewise, if the ferroelectric material has a positive polarization, negative charge accumulates at the terminal. Additionally, the voltages in hysteresis curves 300-a and 300-b represent a voltage difference across the capacitor and are directional. For example, a positive voltage may be realized by applying a positive voltage to the terminal in question (e.g., a cell plate) and maintaining the second terminal (e.g., a cell bottom) at ground (or approximately zero volts (0V)). A negative voltage may be applied by maintaining the terminal in question at ground and applying a positive voltage to the second terminal—e.g., positive voltages may be applied to negatively polarize the terminal in question. Similarly, two positive voltages, two negative voltages, or any combination of positive and negative voltages may be applied to the appropriate capacitor terminals to generate the voltage difference shown in hysteresis curves 300-a and 300-b.

As depicted in hysteresis curve 300-a, the ferroelectric material may maintain a positive or negative polarization with a zero-voltage difference, resulting in two possible charged states: a charge state 305 and a charge state 310. According to the example of FIG. 3, charge state 305 represents a logic 0 and charge state 310 represents a logic 1. In some examples, the logic values of the respective charge states may be reversed to accommodate other schemes for operating a memory cell.

A logic 0 or 1 may be written to the memory cell by controlling the electric polarization of the ferroelectric material, and thus the charge on the capacitor terminals, by applying voltage. For example, applying a net positive voltage 315 across the capacitor results in charge accumulation until charge state 305-a is reached. Upon removing voltage 315, charge state 305-a follows path 320 until it reaches charge state 305 at zero voltage. Similarly, charge state 310 is written by applying a net negative voltage 325, which results in charge state 310-a. After removing negative voltage 325, charge state 310-a follows path 330 until it reaches charge state 310 at zero voltage. Charge states 305-a and 310-a may also be referred to as the remnant polarization (Pr) values, e.g., the polarization (or charge) that remains upon removing the external bias (e.g., voltage). The coercive voltage is the voltage at which the charge (or polarization) is zero. In some examples, data may be stored for long periods of time in the same memory cell. Storing data in the same cell may cause imprint or may cause distortion of the hysteresis curves of the memory cell. This distortion may cause reliability issues by introducing errors in the stored data. Because of this issue, data may be opportunistically transferred from a first location of a bank cluster to a different location in the same or different bank cluster during an access period to reduce the occurrence of this problem.

To read, or sense, the stored state of the ferroelectric capacitor, a voltage may be applied across the capacitor. In response, the stored charge, Q, changes, and the degree of the change depends on the initial charge state—e.g., the final stored charge (Q) depends on whether charge state 305-b or 310-b was initially stored. For example, hysteresis curve 300-b illustrates two possible stored charge states 305-b and 310-b. Voltage 335 may be applied across the capacitor 240 as discussed with reference to FIG. 2. In other cases, a fixed voltage may be applied to the cell plate and, although depicted as a positive voltage, voltage 335 may be negative. In response to voltage 335, charge state 305-b may follow path 340. Likewise, if charge state 310-b was initially stored, then it follows path 345. The final position of charge state 305-c and charge state 310-c depend on one or more factors, including the specific sensing scheme and circuitry.

In some cases, the final charge may depend on the intrinsic capacitance of the digit line connected to the memory cell. For example, if the capacitor is electrically connected to the digit line and voltage 335 is applied, the voltage of the digit line may rise due to its intrinsic capacitance. A voltage measured at a sense component may not equal voltage 335 and instead may depend on the voltage of the digit line. The position of final charge states 305-c and 310-c on hysteresis curve 300-b may thus depend on the capacitance of the digit line and may be determined through a load-line analysis—e.g., charge states 305-c and 310-c may be defined with respect to the digit line capacitance. As a result, the voltage of the capacitor, voltage 350 or voltage 355, may be different and may depend on the initial state of the capacitor.

By comparing the digit line voltage to a reference voltage, the initial state of the capacitor may be determined. The digit line voltage may be the difference between voltage 335 and the final voltage across the capacitor, voltage 350 or voltage 355—e.g., the difference between the voltage 335 and the voltage 350 or the different between the voltage 335 and the voltage 355. A reference voltage may be generated such that its magnitude is between the two possible voltages of the two possible digit line voltages to determine the stored logic state—e.g., if the digit line voltage is higher or lower than the reference voltage. Upon comparison by the sense component, the sensed digit line voltage may be determined to be higher or lower than the reference voltage, and the stored logic value of the ferroelectric memory cell (e.g., a logic 0 or 1) may be determined.

In some cases, a ferroelectric memory cell may maintain the initial logic state after a read operation. For example, if charge state 305-b is stored, the charge state may follow path 340 to charge state 305-c during a read operation and, after removing voltage 335, the charge state may return to initial charge state 305-b by following path 340 in the opposite direction. In some cases, a ferroelectric memory cell may lose its initial logic state after a read operation. For example, if charge state 310-b is stored, the charge state may follow path 345 to charge state 305-c during a read operation and, after removing voltage 335, the charge state may relax to the charge state 305-b by following path 340.

Hysteresis curve 300-b illustrates an example of reading a memory cell that is configured to store the charge state 305-b and the charge state 310-b. A read voltage 335 may be applied, for example, as a voltage difference via a digit line 215 and a plate line 220 as described with reference to FIG.

2. Hysteresis curve 300-b may illustrate read operations where the read voltage 335 is negative voltage difference Vcap (e.g., where Vbottom−Vplate is negative). A negative read voltage across the capacitor may be referred to as a "plate high" read operation, where a plate line 220 is taken initially to a high voltage, and a digit line 215 is initially at a low voltage (e.g., a ground voltage). Although read voltage 335 is shown as a negative voltage across the ferroelectric capacitor 240, in alternative operations a read voltage may be a positive voltage across the ferroelectric capacitor 240, which may be referred to as a "plate low" read operation.

The read voltage 335 may be applied across the ferroelectric capacitor 240 when a memory cell 205 is selected (e.g., by activating a switching component 245 as described with reference to FIG. 2). Upon applying the read voltage 335 to the ferroelectric capacitor 240, charge may flow into or out of the ferroelectric capacitor 240 via the digit line 215 and plate line 220, and different charge states may result depending on whether the ferroelectric capacitor 240 was at charge state 305-a (e.g., a logic 1) or at charge state 310-a (e.g., a logic 0).

Figure 4:
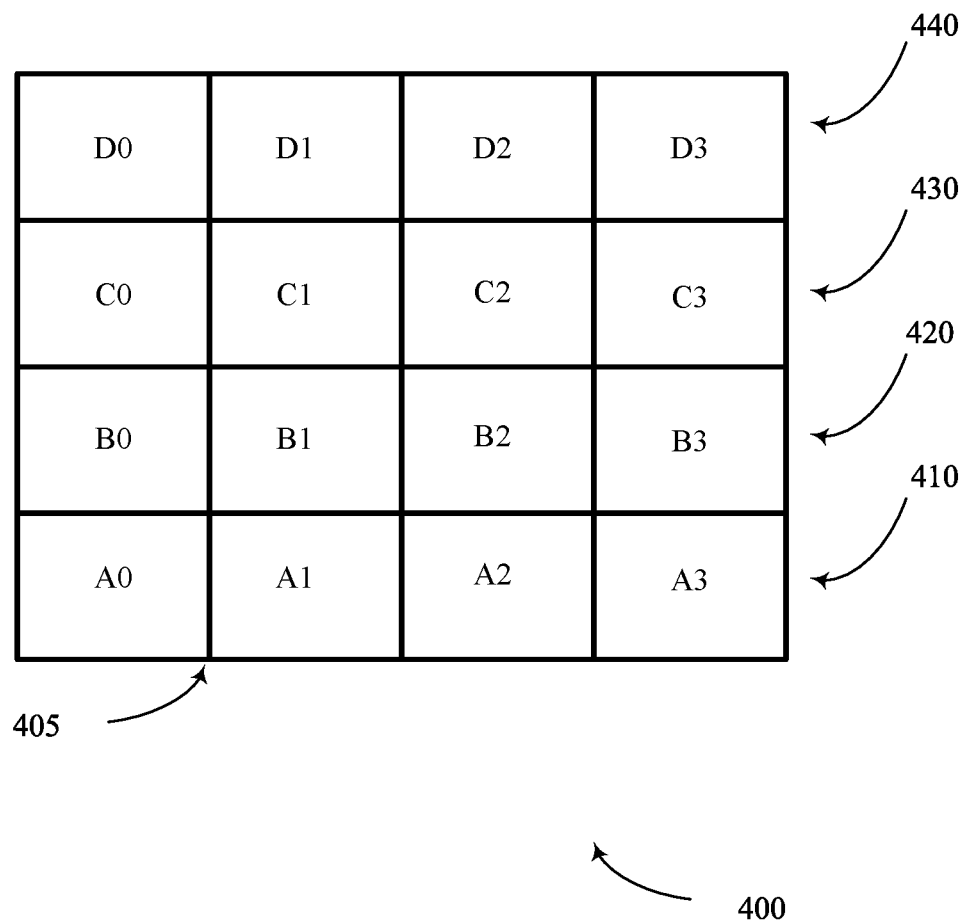
FIG. 4 illustrates an example of a system that supports data transfer for wear-leveling as disclosed herein.

FIG. 4 illustrates an example of a system 400 for data transfer for wear-leveling. In some examples, system 400 may include one or more components described above with reference to FIGS. 1, 2, and 3. For example, system 400 may include a memory device 405, which may be an example of a memory device 110 as described with reference to FIG. 1. The memory device 405 may include banks and bank clusters as discussed herein.

In some examples, memory devices may include banks that may be configured to store data. Memory devices may include large quantities of banks which may be grouped into bank clusters. Further, any quantity of banks may be included in a bank cluster. A bank cluster may be a collection of banks in which a host device may access one bank at a time during an access period of an access operation. In addition, in some cases, the memory device may be configured to access other banks of a bank cluster at the same time that the host device is causing one of the banks of the bank cluster to be accessed. For example, two different banks that may be accessed by the host device during the same access period may not both be in the same bank cluster. FIG. 4 illustrates sixteen banks and four bank clusters, in which each bank cluster includes four banks. A system 400 may include any quantity of banks in any quantity of bank clusters, in other examples.

As depicted in FIG. 4, banks A0, A1, A2, and A3 may form a first bank cluster 410. Banks B0, B1, B2, and B3 may form a second bank cluster 420. Banks C0, C1, C2, and C3 may form a third bank cluster 430 and banks D0, D1, D2, and D3 may form a fourth bank cluster 440. Bank A0 may be coupled with bank A1 and bank A0 may also be coupled with bank B0. Bank A1 may be coupled with banks A0, A2, and B1, and so forth.

Also illustrated in FIG. 4, the first bank cluster 410 may be coupled with the second bank cluster 420, the second bank cluster 420 may be coupled with the first bank cluster 410 and third bank cluster 430, and the third bank cluster 430 may be coupled with the second bank cluster 420 and fourth bank cluster 440.

A host device may cause one bank per bank cluster to be accessed during an access period by sending an access command. During the access period that a host device is accessing a bank of a bank cluster, the memory device may access the other banks in the same bank cluster. When the host device is accessing the bank of the bank cluster, the memory device may transfer data from the current bank the data is stored in, to another bank within the same bank cluster. The access period may be a time period during which a host device causes a bank to be accessed according to an access command. The host device may issue multiple access commands during a single access period or the host device may issue a single access command for a single access period. Additionally, the host device may issue multiple access commands for corresponding multiple access periods. For example, the host device may issue a first access command for a first access period and the host device may issue a second access command for a second access period.

In some examples, the device memory controller 155 (as illustrated in FIG. 1) may receive access commands from the host device to access data stored in a bank of a bank cluster in the memory device and during an access period. Additionally, during the access period data may be opportunistically transferred from a first location to a different location. The local memory controllers 265 of FIG. 2, may transfer the data from the first location to a different location according to commands received from the device memory controller 155. A host device may transmit access commands which may include addressing information, thus a bank or a bank cluster may be addressable by the host device when the access command may request access to the corresponding physical address. Additionally, a host device may transmit an access command which may not include addressing information for data stored at a bank or bank cluster and this may be referred to as a non-addressed bank or bank cluster.

In some examples and as illustrated in FIG. 4, data may be waiting to be transferred from a first bank to a second bank of the same bank cluster. The host device may access bank A2 of the first bank cluster 410 during an access period. This may allow the memory device to transfer data that may be stored in any of the non-accessed banks A0, A1, or A3 of the first bank cluster 410 and during the access period as part of a data migration operation. The data may then be transferred from, for example, A0 to A3 while the host device is causing bank A2 to be accessed during the access period. Because the data transfer takes place while the host device is causing the first bank cluster 410 to be accessed, there may be a reduced latency introduced into the memory system.

Additionally and in another example, during this same access period and while the host device is causing bank A2 to be accessed, the data may be transferred within a single bank, such as within bank A3. In yet another example, during this same access period and while the host device is causing bank A2 to be accessed, the data in bank A0 may be transferred to bank A1 of the first bank cluster. As previously discussed, because two operations, accessing and wear-leveling, are taking place at approximately during the same time period, this may be a more efficient and reduced latency method to perform wear-leveling.

Figure 5:
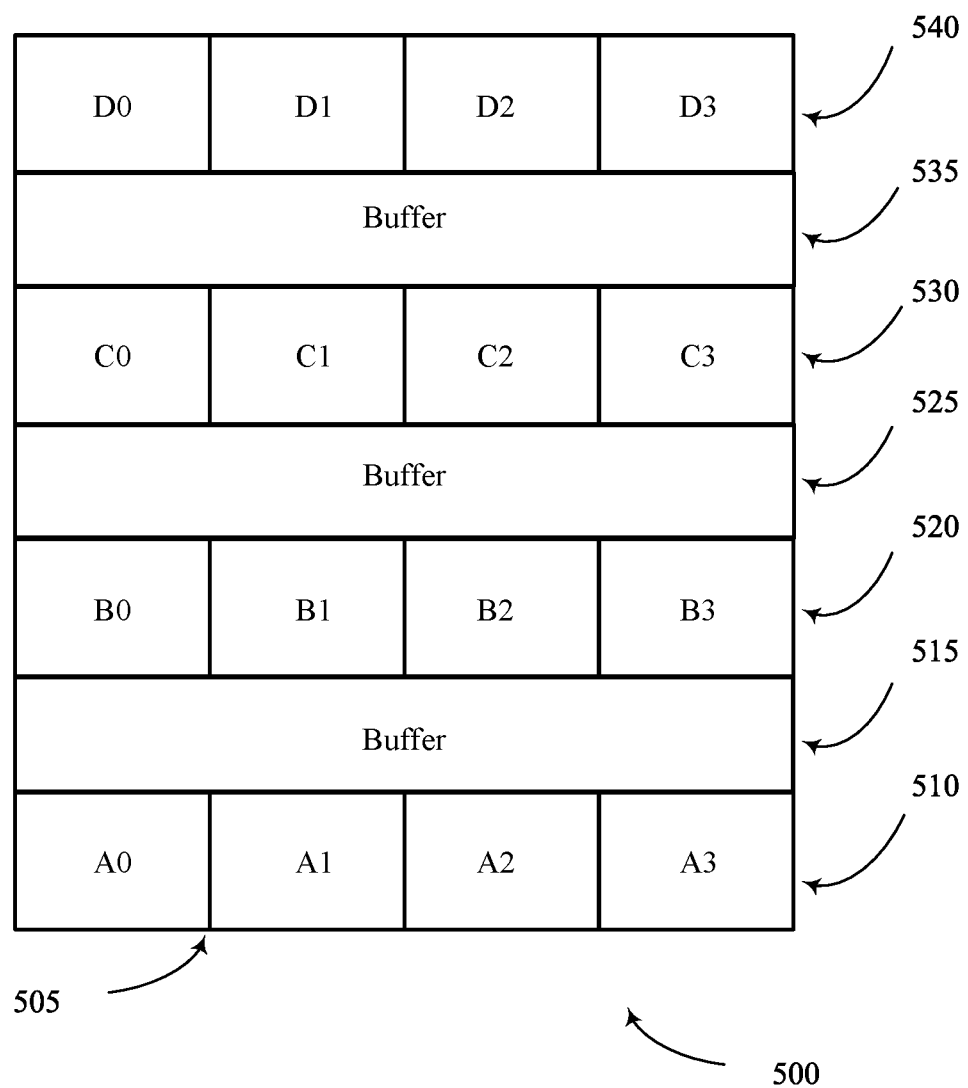
FIG. 5 illustrates an example of a system that supports data transfer for wear-leveling as disclosed herein.

FIG. 5 illustrates an example of a system 500 for data transfer for wear-leveling. In some examples, system 500 may include one or more components described above with reference to FIGS. 1, 2, 3, and 4. For example, system 500 may include a memory device 505, which may be an example of a memory device 110 as described with reference to FIG. 1, memory device 505 may include banks and bank clusters as described with reference to FIG. 4. The memory device of FIG. 5 may include buffers, banks, and bank clusters as discussed herein.

In FIG. 5, buffers may be located between the bank clusters and may be coupled with the bank clusters. In some examples, the first bank cluster 510, that includes banks A0, A1, A2, and A3, may be coupled with a first buffer 515. The first buffer 515 may be coupled with the first bank cluster 510 and the second bank cluster 520 that includes banks B0, B1, B2, and B3. The second buffer 525 may be coupled with the second bank cluster 520 and the third bank cluster 530 and the third buffer 535 may be coupled with the third bank cluster 530 and the fourth bank cluster 540. The buffers may be static random access memory (SRAM), volatile memory, non-volatile memory, sense amplifier components, an area of a memory cell that is separate from the bank, or any combination thereof.

In some examples, the memory device may receive an access command from a host device and the memory device may receive a data migration command. The access command may be any type of command, such as a read command, write command, execute command, refresh command, re-write command, any combination thereof and so forth. In some examples, the device memory controller 155, the local memory controller 165, or a local memory controller 265 (described with reference to FIGS. 1 and 2) may receive access commands from a host device to access data stored in a bank of a bank cluster in the memory device and during an access period. Additionally, during the access period, data may be opportunistically transferred from a first location to a different location. The local memory controllers 165 or 265 described with reference to FIGS. 1 and 2, may transfer the data from the first location to a different location according to commands received from the device memory controller 155 and/or according to a data migration command. In some examples, the device memory controller 155 or the local memory controllers 165, 265 may determine that a data migration operation is waiting to be performed.

The data migration command may be a command to transfer data for wear-leveling purposes. In one example, the data migration command may include transferring the data from the original storage location and the data being transferred to the final or destination storage location. The final or destination storage location for data may not be the last place the data will be stored in the memory device. The final or destination storage location may be the location to which the data is moved for wear-leveling. At some point, the final or destination storage location of the data may become the original storage location for another data migration command, and so forth. In another example, the data migration command may include transferring data from the original storage location to a temporary storage location such as a buffer. In some cases, a data migration command may include a single read, write, evict, or commit command. In some cases, a data migration command may include a plurality of read, write, evict, or commit commands used to transfer data from a first location to a second location.

In some examples, data may be transferred from a bank of a first bank cluster 510 to a bank of a second bank cluster 520 via the first buffer 515. The data may be stored in bank A0 of the first bank cluster 510 and may be waiting for transfer from the first bank cluster 510 to the second bank cluster 520. The data of bank A0 in the first bank cluster 510 may be read or sensed. The data may be written to the first buffer 515 once the host device causes a bank (e.g., A1, A2, A3) to be accessed, during a first access period, that is also located in the first bank cluster 510. In some cases, the bank accessed in response to receiving an access command from the host device may be a different bank than the bank in which the data is stored, bank A0. After the data is transferred to the first buffer 515, the memory device may wait until the host device causes bank B0 of a second bank cluster 520 to be accessed during a first access period, in which the second bank cluster 520 is the destination bank cluster of the data. While the host device is causing bank B0 of the second bank cluster 520 to be accessed, during the second access period, the memory device may transfer the data from the first buffer 515 and write the data to the non-accessed bank (e.g., B1, B2, B3) of the second bank cluster 520. In this way, the memory device may opportunistically transfer data.

In some examples, data may be transferred from a first bank B0 of a second bank cluster 520 to a second bank B1 of the second bank cluster 520 via either the first buffer 515 or second buffer 525. The data may be stored in a bank B0 of the second bank cluster 520 and may be waiting for transfer between a first and second bank, B0 and B1 respectively, of the second bank cluster 520. The data of the first bank B0 in the second bank cluster 520 may be read or sensed. The data may be written to the first buffer 515 or the second buffer 525 once the host device causes a bank (e.g., B2, B3) that is also located in the second bank cluster 520 to be accessed, during a first access period, and the accessed bank is a different bank than the bank in which the data is stored, bank B0. After the data is transferred to the second buffer 525, the memory device may wait until the host device causes, a bank (e.g., B0, B2, B3) of the second bank cluster 520 to be accessed during a second access period. While the host device is causing the second bank cluster 520 to be accessed during the second access period, the data may be transferred from the first buffer 515 or second buffer 525 back to a non-accessed bank B1 of the second bank cluster 520. In some cases, the memory device may not be permitted to perform a data migration on a bank of a bank cluster that is being accessed in response to an access command issued by the host device.

In some examples, the memory device may receive an access command from the host device to access a data set from A0 of the first bank cluster 510 during an access period. Then the local memory controller may be caused to access during the access period the data stored in A0, and may additionally cause a second data set from bank A1 of the first bank cluster 510 to be accessed as part of a data migration operation. The second data set from bank A1 of the first bank cluster 510 may be transferred during the access period to a different storage location such as a different bank of the first bank cluster 510, a different destination bank cluster such as the second bank cluster 520, or the first buffer 515. In some examples, a transfer of the second data set to the different storage location may be delayed until a second access command for another bank of the second bank cluster 520 is received from the host device.

Additionally, a data migration operation may be performed during at least a portion of the access period when the host device is accessing the first data set from the first bank cluster 510, and a data migration operation may be performed during at least a portion of a second access period when the host device is accessing a destination bank cluster for the second data set. Further, a data migration operation may be performed during the access period by transferring the data from the first bank cluster 510, where the host device causes the first bank cluster 510 to be accessed and a data migration operation may be performed during the second access period by transferring data to the second bank cluster 520, where the host device causes the second bank cluster 520 to be accessed.

In some examples, a system may include a first bank A0 of the first bank cluster 510, a second bank A1 of the first bank cluster 510, and a first buffer 515, where the first buffer 515 provides temporary storage as part of a data migration operation when data is transferred between a bank cluster and a different storage location. The first and second bank, A0 and A1 respectively, and the first buffer 515 may be configured to transfer data between the second bank A1 of the first bank cluster 510 and the first buffer 515 during an access period concurrently with the data stored in the first bank A0 of the first bank cluster 510 being accessed by a host device during the access period. Further, the system may include a third bank A2 of the first bank cluster 510, where the first bank A0, the second bank, A1, and the buffer 515 are configured to transfer data between the first buffer 515 and the third bank A2 as part of the data migration operation. Further, the first bank A1 or the second bank A1 of the first bank cluster 510 may be addressable by the host device during a second access period, in which the system is configured to transfer the second data set between the third bank A2 of the first bank cluster 510 and a bank of the first bank cluster 510 that is not addressed by the host device.

Figure 6:
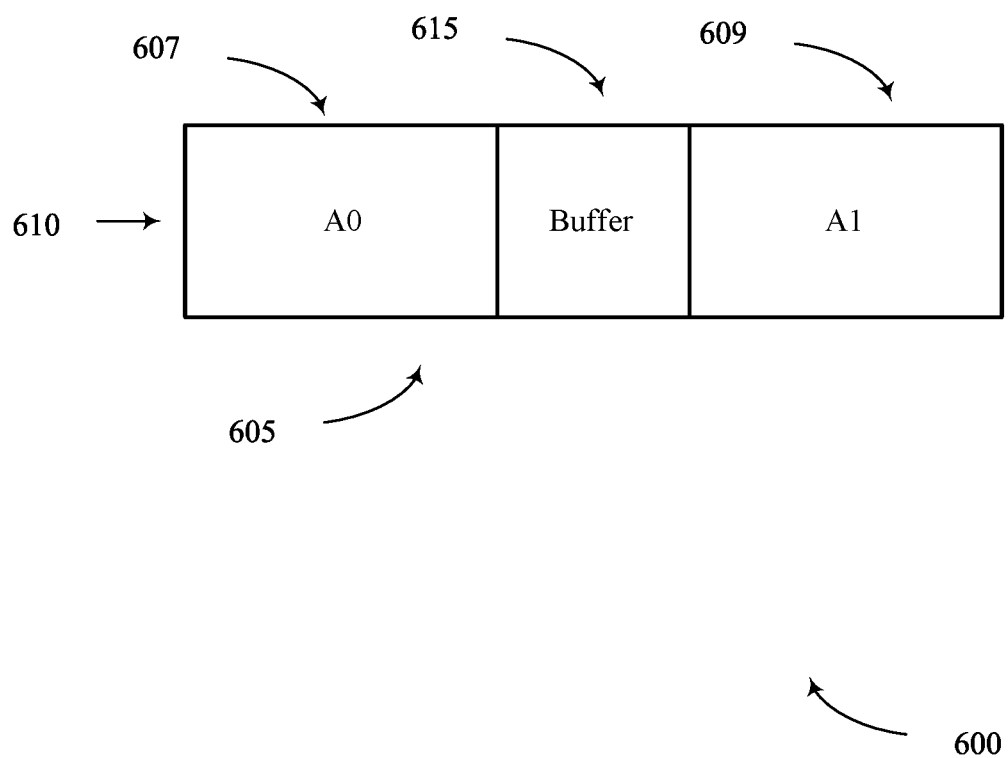
FIG. 6 illustrates an example of a system that supports data transfer for wear-leveling as disclosed herein.

FIG. 6 illustrates an example of a system 600 for data transfer for wear-leveling. In some examples, system 600 may include one or more components described above with reference to FIGS. 1, 2, 3, 4, and 5. For example, system 600 may include a memory device 605, which may be an example of a memory device 110 as described with reference to FIG. 1, system 600 may include banks and bank clusters as described with reference to FIGS. 4 and 5. The memory device 605 of FIG. 6 may include a buffer 615, a first bank 607, a second bank 609, and a bank cluster 610.

In some examples and as illustrated in FIG. 6, the bank cluster 610 may include two banks a first bank A0, 607, and a second bank A1,609, and a buffer 615. In this example, a host device may cause bank A1 609 to be accessed according to an access command while data may be transferred from bank A0 607 to the buffer 615, and then the data may be transferred from the buffer 615 to bank A1 609 while the host device causes bank A0 607 to be accessed during an access period, or vice versa.

In some examples, the device memory controller 155 (as illustrated in FIG. 1) may receive access commands from the host device to access data stored in a bank of a bank cluster in the memory device and during an access period. Additionally, during the access period, data may be opportunistically transferred from a first location to a different location. The local memory controllers 265 of FIG. 2, may transfer the data from the first location to a different location according to commands received from the device memory controller 155 and/or according to a data migration command. In some examples, the device memory controller 155 may determine that a data migration operation is waiting to be performed.

Additionally, in any of FIGS. 4-6, data may be transferred within a bank of a bank cluster according to a data migration operation. For example, a host device may access bank A0 607 of the first bank cluster 610 and data may be transferred from a first page to a second page within bank A1 609 of the first bank cluster 610.

Figure 7:
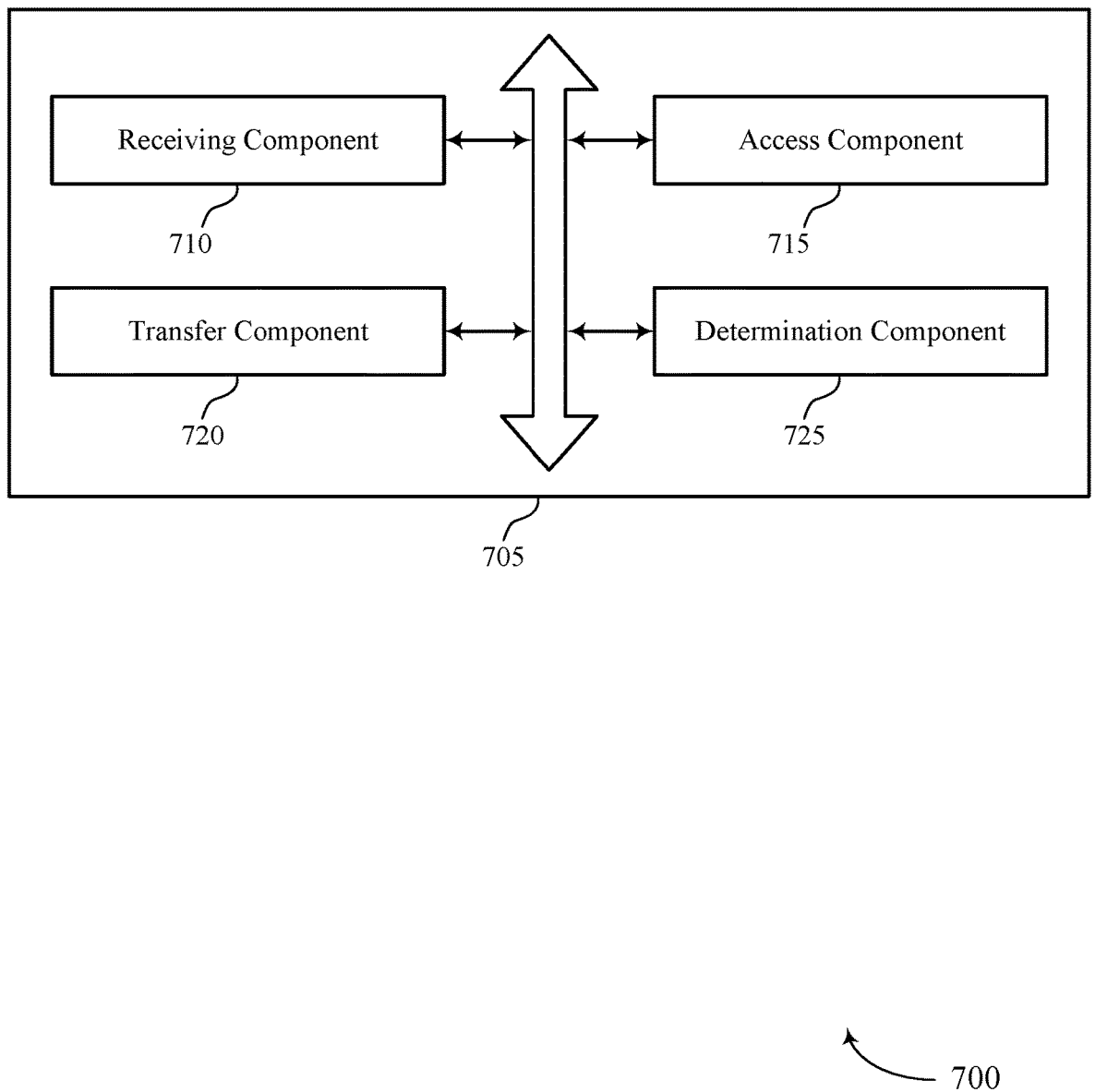
FIG. 7 illustrates a block diagram of a device that supports data transfer for wear-leveling as disclosed herein.

FIG. 7 shows a block diagram 700 of a memory component 705 that supports data transfer for wear-leveling as disclosed herein. The memory component 705 may be an example of aspects of a memory device as described with reference to FIGS. 1-6. The memory component 705 may include receiving component 710, access component 715, transfer component 720, and determination component 725. Each of these components may communicate, directly or indirectly, with one another (e.g., via one or more buses).

Receiving component 710 may cause the memory device to receive, at a memory device from a host device, an access command to access a first data set stored in a first bank of a first bank cluster of the memory device during an access period.

Access component 715 may cause the memory device to access, during the access period, the first data set stored in the first bank of the first bank cluster based on receiving the access command from the host device. Access component may additionally cause the memory device to access, during the access period, a second data set stored in a second bank of the first bank cluster as part of a data migration operation based on accessing the first data set.

Transfer component 720 may cause the memory device to transfer, during the access period, the second data set between the second bank of the first bank cluster and a different storage location based on accessing the second data set.

Determination component 725 may cause the memory device to determine that the data migration operation associated with the first bank cluster is waiting to be performed, where the second data set is accessed based on the determination.

Figure 8:
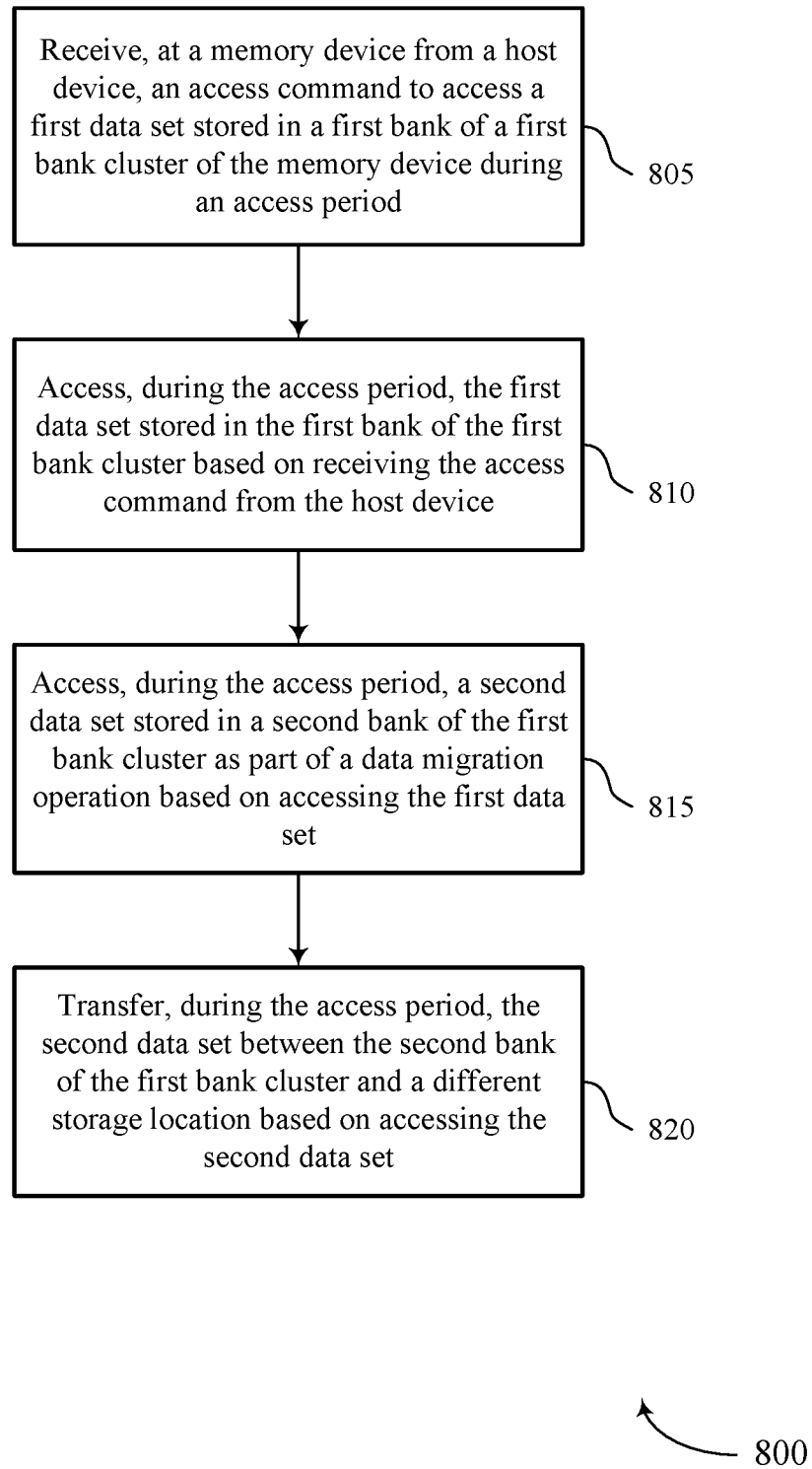
FIGS. 8-11 illustrate flow diagrams of a method or methods that support data transfer for wear-leveling as disclosed herein.

FIG. 8 shows a flowchart illustrating a method 800 that supports data transfer for wear-leveling as disclosed herein. The operations of method 800 may be implemented by a controller or its components as described herein. For example, the operations of method 800 may be performed by a controller (e.g., controllers 155, 165, or 265) as described with reference to FIGS. 1, 2, and 4 through 7. In some examples, a controller may execute a set of instructions to control the functional elements of a memory device to perform the functions described below. Additionally or alternatively, a controller may perform aspects of the functions described below using special-purpose hardware.

At 805, the controller may receive, at a memory device from a host device, an access command to access a first data set stored in a first bank of a first bank cluster of the memory device during an access period. The operations of 805 may be performed according to the methods described herein. In some examples, aspects of the operations of 805 may be performed by a receiving component as described with reference to FIG. 7.

At 810, the controller may access, during the access period, the first data set stored in the first bank of the first bank cluster based on receiving the access command from the host device. The operations of 810 may be performed according to the methods described herein. In some examples, aspects of the operations of 810 may be performed by an access component as described with reference to FIG. 7.

At 815, the controller may access, during the access period, a second data set stored in a second bank of the first bank cluster as part of a data migration operation based on accessing the first data set. The operations of 815 may be performed according to the methods described herein. In some examples, aspects of the operations of 815 may be performed by an access component as described with reference to FIG. 7.

At 820, the controller may transfer, during the access period, the second data set between the second bank of the first bank cluster and a different storage location based on accessing the second data set. The operations of 820 may be performed according to the methods described herein. In some examples, aspects of the operations of 820 may be performed by a transfer component as described with reference to FIG. 7.

In some examples, an apparatus as described herein may perform a method or methods, such as the method 800. The apparatus may include features, means, or instructions (e.g., a non-transitory computer-readable medium storing instructions executable by a processor) for receiving, at a memory device from a host device, an access command to access a first data set stored in a first bank of a first bank cluster of the memory device during an access period, accessing, during the access period, the first data set stored in the first bank of the first bank cluster based at least in part on receiving the access command from the host device, accessing, during the access period, a second data set stored in a second bank of the first bank cluster as part of a data migration operation based at least in part on accessing the first data set, and transferring, during the access period, the second data set between the second bank of the first bank cluster and a different storage location based at least in part on accessing the second data set.

In some examples, an apparatus as described herein may perform a method or methods, such as the method 800. The apparatus may include features, means, or instructions (e.g., a non-transitory computer-readable medium storing instructions executable by a processor) for determining that the data migration operation associated with the first bank cluster is waiting to be performed, wherein the second data set is accessed based at least in part on the determination, and for performing the data migration operation during at least a portion of the access period based at least in part on the host device accessing the first data set stored in the first bank of the first bank cluster, and performing the data migration operation during at least a portion of a second access period based at least in part on the host device accessing a destination bank cluster for the second data set, wherein the different storage location is a buffer configured to provide temporary storage for data.

In some examples, an apparatus as described herein may perform a method or methods, such as the method 800. The apparatus may include features, means, or instructions (e.g., a non-transitory computer-readable medium storing instructions executable by a processor) for transferring the second data set from the buffer to the first bank of the first bank cluster during a second access period while the second bank of the first bank cluster is accessed in response to the access command.

In some examples, an apparatus as described herein may perform a method or methods, such as the method 800. The apparatus may include features, means, or instructions (e.g., a non-transitory computer-readable medium storing instructions executable by a processor) for receiving a second access command, accessing, during a second access period, a third bank of a second bank cluster, based at least in part on receiving the second access command, and transferring, during the second access period, the second data set from the buffer to a fourth bank of the second bank cluster, the fourth bank configured to store multiple data sets.

In some examples, an apparatus as described herein may perform a method or methods, such as the method 800. The apparatus may include features, means, or instructions (e.g., a non-transitory computer-readable medium storing instructions executable by a processor) for transferring, during a second access period, the second data set from the different storage location to a third bank of the first bank cluster, the third bank configured to store multiple data sets, and accessing, during the second access period, any of the first bank, the second bank, or a fourth bank of the first bank cluster.

In some examples, an apparatus as described herein may perform a method or methods, such as the method 800. The apparatus may include features, means, or instructions (e.g., a non-transitory computer-readable medium storing instructions executable by a processor) for performing, during the access period, the data migration operation by transferring data from the first bank cluster that is being accessed by the host device, and performing, during a second access period, the data migration operation by transferring data to a second bank cluster that is being accessed by the host device.

In some examples, an apparatus as described herein may perform a method or methods, such as the method 800. The apparatus may include features, means, or instructions (e.g., a non-transitory computer-readable medium storing instructions executable by a processor) for delaying a transfer of the second data set from the different storage location to third bank of a second bank cluster, until a second access command for a fourth bank of the second bank cluster is received from the host device, and receiving, at the memory device, a second access command from the host device and accessing a destination bank cluster for the second data set during a second access period.

In some examples, an apparatus as described herein may perform a method or methods, such as the method 800. The apparatus may include features, means, or instructions (e.g., a non-transitory computer-readable medium storing instructions executable by a processor) for accessing, during the second access period and based at least in part on receiving the second access command from the host device, the second bank of a second bank cluster, and transferring, during the second access period, the second data set from the different storage location to another bank of the second bank cluster that is different than the second bank of the second bank cluster.

Figure 9:
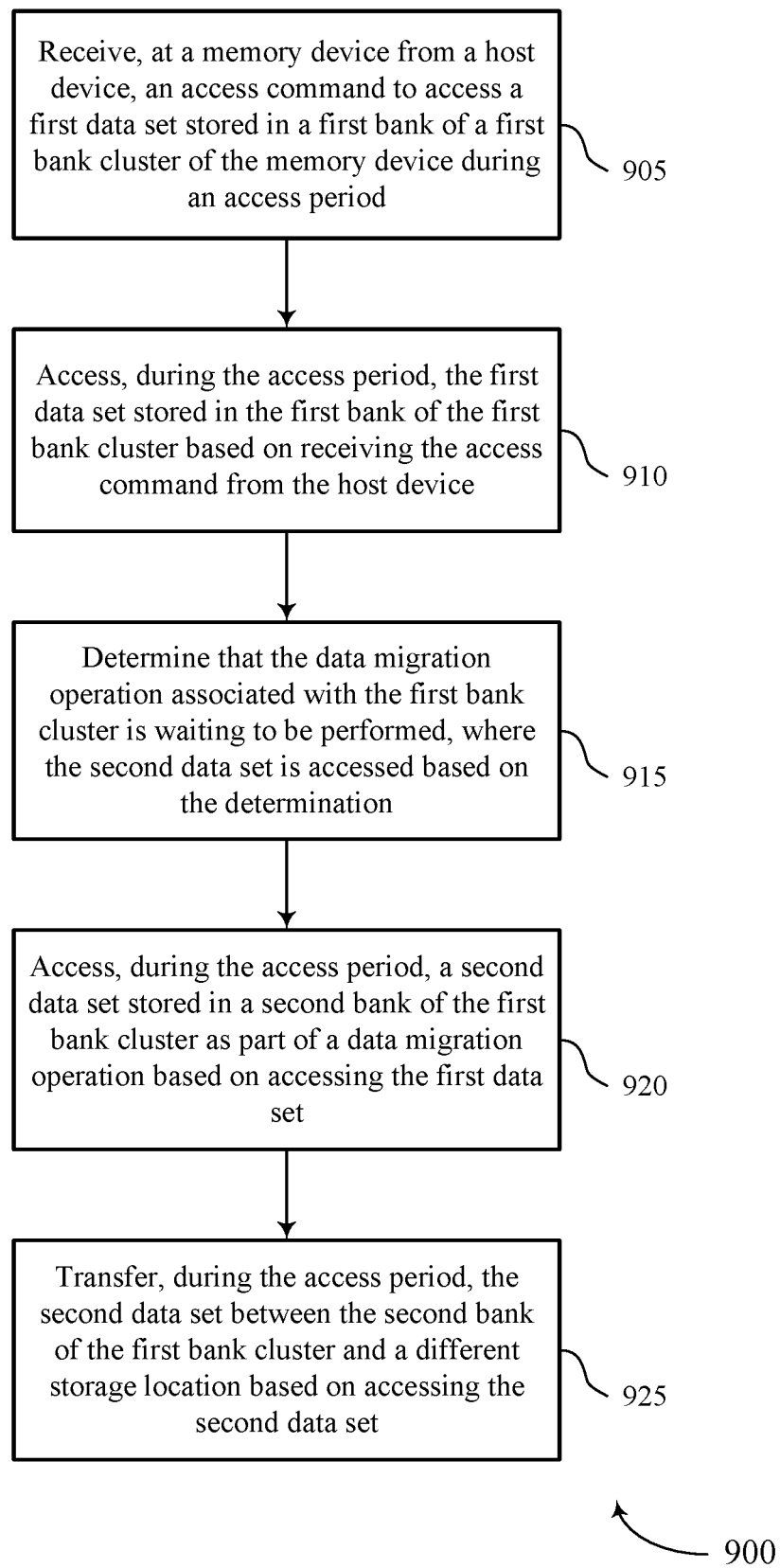

FIG. 9 shows a flowchart illustrating a method 900 that supports data transfer for wear-leveling as disclosed herein. The operations of method 900 may be implemented by a controller or its components as described herein. For example, the operations of method 900 may be performed by a controller (e.g., controllers 155, 165, or 265) as described with reference to FIGS. 1, 2, and 4 through 7. In some examples, a controller may execute a set of instructions to control the functional elements of the memory device to perform the functions described below. Additionally or alternatively, a controller may perform aspects of the functions described below using special-purpose hardware.

At 905, the controller may receive, at a memory device from a host device, an access command to access a first data set stored in a first bank of a first bank cluster of the memory device during an access period. The operations of 905 may be performed according to the methods described herein. In some examples, aspects of the operations of 905 may be performed by a receiving component as described with reference to FIG. 7.

At 910, the controller may access, during the access period, the first data set stored in the first bank of the first bank cluster based on receiving the access command from the host device. The operations of 910 may be performed according to the methods described herein. In some examples, aspects of the operations of 910 may be performed by an access component as described with reference to FIG. 7.

At 915, the controller may determine that the data migration operation associated with the first bank cluster is waiting to be performed, where the second data set is accessed based on the determination. The operations of 915 may be performed according to the methods described herein. In some examples, aspects of the operations of 915 may be performed by a determination component as described with reference to FIG. 7.

At 920, the controller may access, during the access period, a second data set stored in a second bank of the first bank cluster as part of a data migration operation based on accessing the first data set. The operations of 920 may be performed according to the methods described herein. In some examples, aspects of the operations of 920 may be performed by an access component as described with reference to FIG. 7.

At 925, the controller may transfer, during the access period, the second data set between the second bank of the first bank cluster and a different storage location based on accessing the second data set. The operations of 925 may be performed according to the methods described herein. In some examples, aspects of the operations of 925 may be performed by a transfer component as described with reference to FIG. 7.

Figure 10:
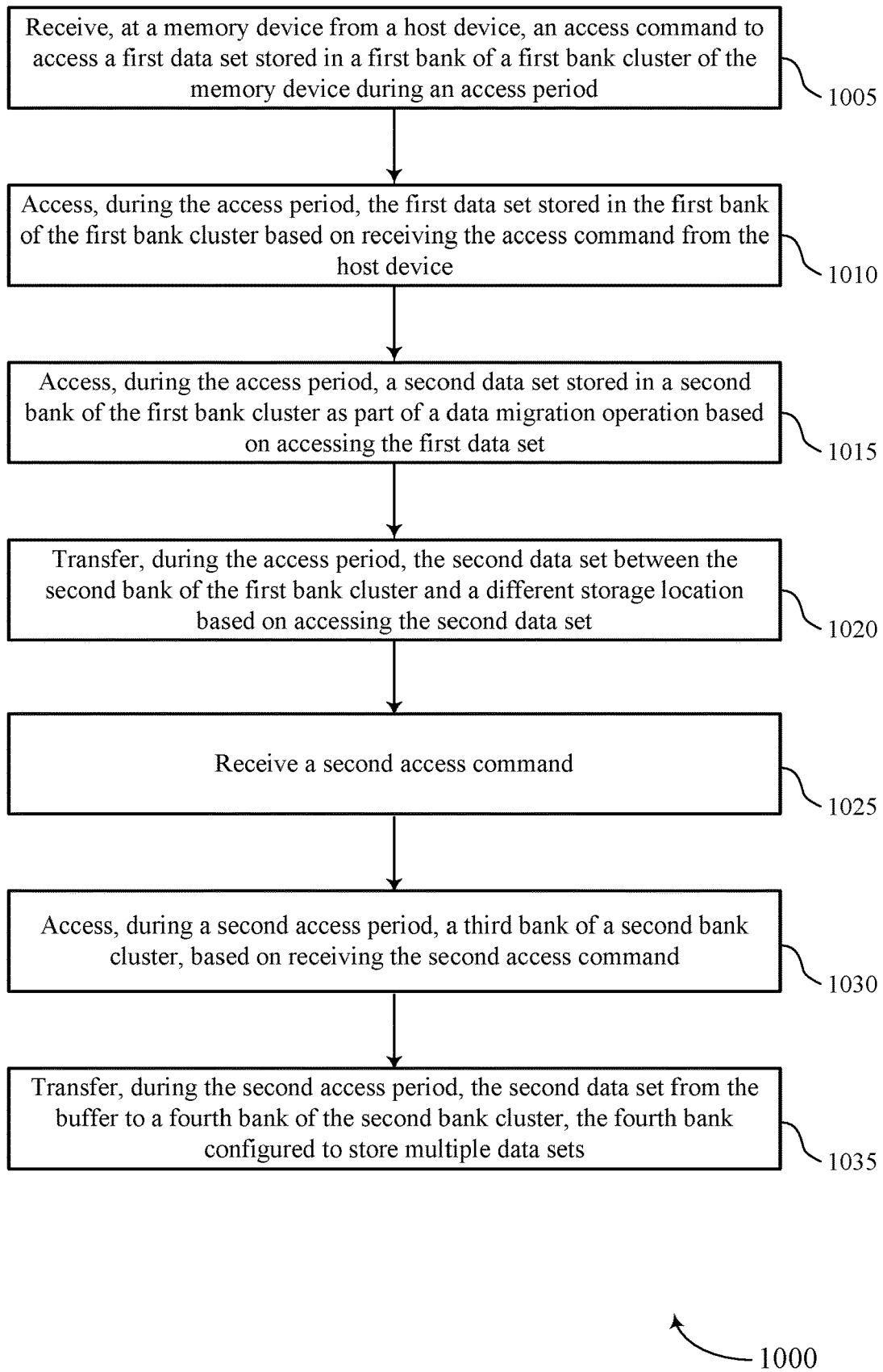

FIG. 10 shows a flowchart illustrating a method 1000 that supports data transfer for wear-leveling as disclosed herein. The operations of method 1000 may be implemented by a controller or its components as described herein. For example, the operations of method 800 may be performed by a controller (e.g., controllers 155, 165, or 265) as described with reference to FIGS. 1, 2, and 4 through 7. In some examples, a controller may execute a set of instructions to control the functional elements of the memory device to perform the functions described below. Additionally or alternatively, a controller may perform aspects of the functions described below using special-purpose hardware.

At 1005, the controller may receive, at a memory device from a host device, an access command to access a first data set stored in a first bank of a first bank cluster of the memory device during an access period. The operations of 1005 may be performed according to the methods described herein. In some examples, aspects of the operations of 1005 may be performed by a receiving component as described with reference to FIG. 7.

At 1010, the controller may access, during the access period, the first data set stored in the first bank of the first bank cluster based on receiving the access command from the host device. The operations of 1010 may be performed according to the methods described herein. In some examples, aspects of the operations of 1010 may be performed by an access component as described with reference to FIG. 7.

At 1015, the controller may access, during the access period, a second data set stored in a second bank of the first bank cluster as part of a data migration operation based on accessing the first data set. The operations of 1015 may be performed according to the methods described herein. In some examples, aspects of the operations of 1015 may be performed by an access component as described with reference to FIG. 7.

At 1020, the controller may transfer, during the access period, the second data set between the second bank of the first bank cluster and a different storage location based on accessing the second data set. The operations of 1020 may be performed according to the methods described herein. In some examples, aspects of the operations of 1020 may be performed by a transfer component as described with reference to FIG. 7.

At 1030, the controller may receive a second access command. The operations of 1030 may be performed according to the methods described herein. In some examples, aspects of the operations of 1030 may be performed by a receiving component as described with reference to FIG. 7.

At 1035, the controller may access, during a second access period, a third bank of a second bank cluster, based on receiving the second access command. The operations of 1035 may be performed according to the methods described herein. In some examples, aspects of the operations of 1035 may be performed by an access component as described with reference to FIG. 7.

At 1040, the controller may transfer, during the second access period, the second data set from the buffer to a fourth bank of the second bank cluster, the fourth bank configured to store multiple data sets. The operations of 1040 may be performed according to the methods described herein. In some examples, aspects of the operations of 1040 may be performed by a transfer component as described with reference to FIG. 7.

Figure 11:
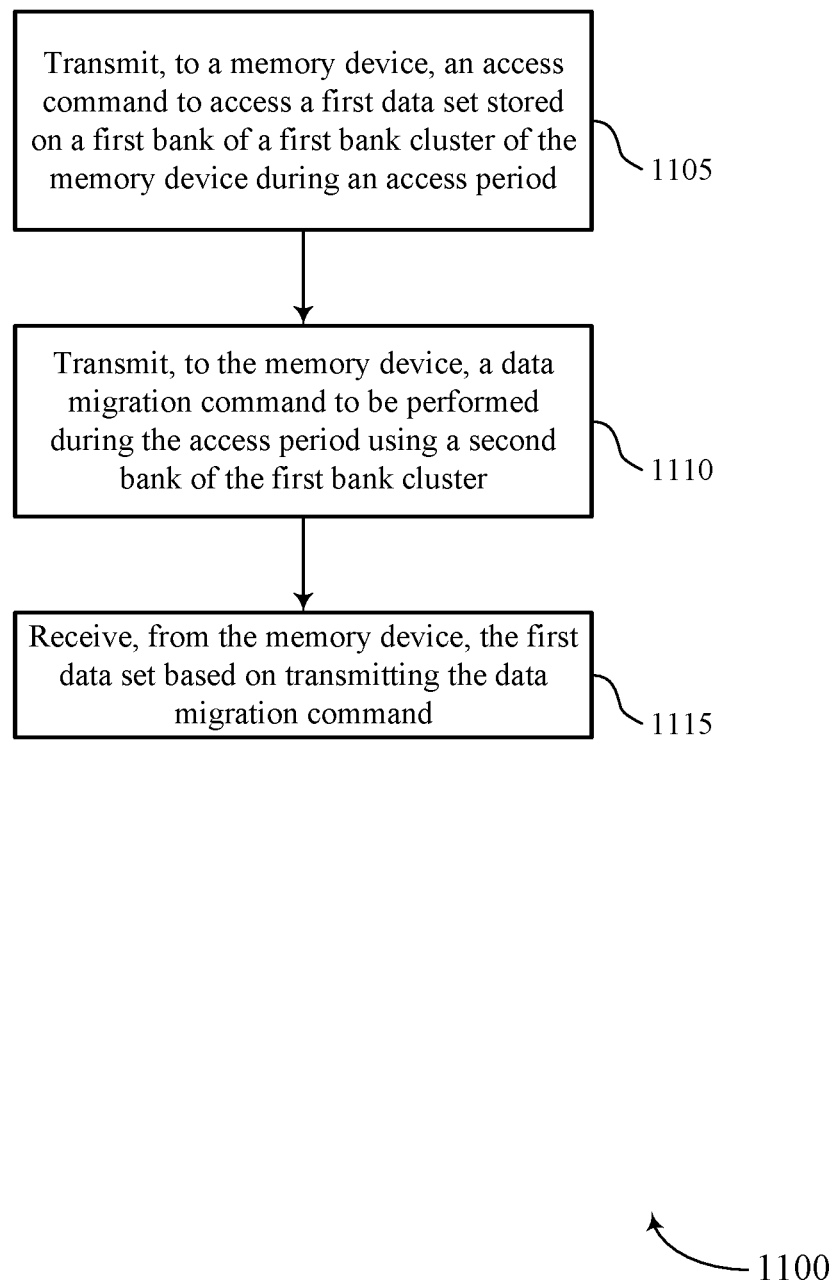

FIG. 11 shows a flowchart illustrating a method 1100 that supports data transfer for wear-leveling as disclosed herein. The operations of method 1100 may be implemented by a controller or its components as described herein. For example, the operations of method 800 may be performed by a controller (e.g., controllers 155, 165, or 265) as described with reference to FIGS. 1, 2, and 4 through 7. In some examples, a controller may execute a set of instructions to control the functional elements of the memory device to perform the functions described below. Additionally or alternatively, a controller may perform aspects of the functions described below using special-purpose hardware.

At 1105, the controller may transmit, to a memory device, an access command to access a first data set stored on a first bank of a first bank cluster of the memory device during an access period. The operations of 1105 may be performed according to the methods described herein. In some examples, aspects of the operations of 1105 may be performed by an access component as described with reference to FIG. 7.

At 1110, the controller may transmit, to the memory device, a data migration command to be performed during the access period using a second bank of the first bank cluster. The operations of 1110 may be performed according to the methods described herein. In some examples, aspects of the operations of 1110 may be performed by an access component as described with reference to FIG. 7.

At 1115, the controller may receive, from the memory device, the first data set based on transmitting the data migration command. The operations of 1115 may be performed according to the methods described herein. In some examples, aspects of the operations of 1115 may be performed by a receiving component as described with reference to FIG. 7.

In some examples, an apparatus as described herein may perform a method or methods, such as the method 1100. The apparatus may include features, means, or instructions (e.g., a non-transitory computer-readable medium storing instructions executable by a processor) for transmitting, to a memory device, an access command to access a first data set stored on a first bank of a first bank cluster of the memory device during an access period, transmitting, to the memory device, a data migration command to be performed during the access period using a second bank of the first bank cluster, and receiving, from the memory device, the first data set based at least in part on transmitting the data migration command.

In some examples, an apparatus as described herein may perform a method or methods, such as the method 1100. The apparatus may include features, means, or instructions (e.g., a non-transitory computer-readable medium storing instructions executable by a processor) for transmitting a second access command to the memory device to access a second data set stored on a third bank of the first bank cluster of the memory device during a second access period, transmitting a second data migration command to the memory device to be performed during the second access period using a buffer configured to temporarily store data, and receiving the second data set from the memory device.

In some examples, an apparatus as described herein may perform a method or methods, such as the method 1100. The apparatus may include features, means, or instructions (e.g., a non-transitory computer-readable medium storing instructions executable by a processor) for receiving, from the memory device, an indication that a data migration operation is complete.

In some examples, an apparatus as described herein may perform a method or methods, such as the method 1100. The apparatus may include features, means, or instructions (e.g., a non-transitory computer-readable medium storing instructions executable by a processor) for receiving, from the memory device, a negative acknowledgement indicating that a data migration operation is waiting to be completed, and determining that the data migration operation associated with the first bank cluster is waiting to be performed based at least in part on receiving the negative acknowledgement.

In some examples, an apparatus may perform aspects of the functions described herein using general- or special-purpose hardware. The apparatus may include a first bank of a first bank cluster, a second bank of the first bank cluster, a buffer configured to provide temporary storage as part of a data migration operation where data is transferred between a bank of the first bank cluster and a different storage location, and wherein the first bank, second bank, and buffer are configured to transfer data between the second bank of the first bank cluster and the buffer during an access period concurrently with data stored in the first bank of the first bank cluster being accessed by a host device during the access period.

In some examples, an apparatus may perform aspects of the functions described herein using general- or special-purpose hardware. The apparatus may include a third bank of the first bank cluster, wherein the controller is configured to transfer data between the buffer and the third bank as part of the data migration operation, wherein the different storage location comprises the third bank of the first bank cluster, and wherein when the first bank or the second bank of the first bank cluster is addressable by the host device during a second access period, and the apparatus is configured to transfer the second data set between the third bank of the first bank cluster and a bank of the first bank cluster that is not addressed by the host device, and wherein the different storage location comprises the buffer, and wherein the apparatus is configured to transfer the second data set from the buffer to the first bank of the first bank cluster during a second access period while the second bank of the first bank cluster is accessed in response to the access command during the second access period, and wherein the apparatus is configured to perform data migration operation during the access period, the second access period, or both.

In some examples, an apparatus may perform aspects of the functions described herein using general- or special-purpose hardware. The apparatus may include a third bank of the first bank cluster, wherein the apparatus is configured to transfer the second data set from the buffer to the third bank of the first bank cluster during a second access period, wherein any of the first bank, the second bank, or a fourth bank of the first bank cluster is accessed in response to the access command, during the second access period, and a second bank cluster configured to receive the second data set of the first bank cluster.

In some examples, an apparatus may perform aspects of the functions described herein using general- or special-purpose hardware. The apparatus may include a fourth bank of a second bank cluster, and a fifth bank of the second bank cluster, wherein the apparatus is configured to migrate the second data set to the buffer during the access period and the apparatus is configured to migrate the second data set to the fourth bank of the second bank cluster during a second access period, while the fifth bank of the second bank cluster is accessed in response to the access command, during the second access period.

It should be noted that the methods described above describe possible implementations, and that the operations and the steps may be rearranged or otherwise modified and that other implementations are possible. Furthermore, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals can be communicated between components over the conductive path. When a component, such as a controller, couples other components together, the component initiates a change that allows signals to flow between the other components over a conductive path that previously did not permit signals to flow.

As used herein, the term "substantially" means that the modified characteristic (e.g., a verb or adjective modified by the term substantially) need not be absolute but is close enough to achieve the advantages of the characteristic.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers.

Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   receiving, at a memory device from a host device, an access command to access a first data set stored in a first bank of a first bank cluster of the memory device during an access period;
   accessing, during the access period, the first data set stored in the first bank of the first bank cluster based at least in part on receiving the access command from the host device;
   determining that a data migration operation associated with the first bank cluster is waiting to be performed based at least in part on accessing the first data set;
   accessing, during the access period, a second data set stored in a second bank of the first bank cluster as part of the data migration operation based at least in part on accessing the first data set and the determination; and
   transferring, during the access period, the second data set between the second bank of the first bank cluster and a different storage location based at least in part on accessing the second data set.

2. The method of claim 1, further comprising:
   performing the data migration operation during at least a portion of the access period based at least in part on the host device accessing the first data set stored in the first bank of the first bank cluster; and
   performing the data migration operation during at least a portion of a second access period based at least in part on the host device accessing a destination bank cluster for the second data set.

3. The method of claim 1, wherein the different storage location is a buffer configured to provide temporary storage for data.

4. The method of claim 3, further comprising:
   transferring the second data set from the buffer to the first bank of the first bank cluster during a second access period while the second bank of the first bank cluster is accessed in response to the access command.

5. The method of claim 3, further comprising:
   receiving a second access command;
   accessing, during a second access period, a third bank of a second bank cluster, based at least in part on receiving the second access command; and
   transferring, during the second access period, the second data set from the buffer to a fourth bank of the second bank cluster, the fourth bank configured to store multiple data sets.

6. The method of claim 1, further comprising:
   transferring, during a second access period, the second data set from the different storage location to a third bank of the first bank cluster, the third bank configured to store multiple data sets; and
   accessing, during the second access period, any of the first bank, the second bank, or a fourth bank of the first bank cluster.

7. The method of claim 1, further comprising:
   performing, during the access period, the data migration operation by transferring data from the first bank cluster that is being accessed by the host device; and
   performing, during a second access period, the data migration operation by transferring data to a second bank cluster that is being accessed by the host device.

8. The method of claim 1, further comprising:
   delaying a transfer of the second data set from the different storage location to third bank of a second bank cluster, until a second access command for a fourth bank of the second bank cluster is received from the host device.

9. The method of claim 1, further comprising:
   receiving, at the memory device, a second access command from the host device; and
   accessing a destination bank cluster for the second data set during a second access period.

10. The method of claim 9, further comprising:
    accessing, during the second access period and based at least in part on receiving the second access command from the host device, the second bank of a second bank cluster; and
    transferring, during the second access period, the second data set from the different storage location to another bank of the second bank cluster that is different than the second bank of the second bank cluster.

11. An apparatus, comprising:
    a first bank of a first bank cluster;
    a second bank of the first bank cluster;
    a buffer configured to provide temporary storage as part of a data migration operation where data is transferred between a bank of the first bank cluster and a different storage location; and
    wherein the first bank, the second bank, and the buffer are configured to transfer data between the second bank of the first bank cluster and the buffer during an access period concurrently with data stored in the first bank of the first bank cluster being accessed by a host device during the access period based at least in part on the data migration operation associated with the first bank cluster waiting to be performed.

12. The apparatus of claim 11, further comprising:
    a third bank of the first bank cluster, wherein the first bank, the second bank, and the buffer are configured to:
    transfer data between the buffer and the third bank as part of the data migration operation, wherein the different storage location comprises the third bank of the first bank cluster.

13. The apparatus of claim 12, wherein, when the first bank or the second bank of the first bank cluster is addressable by the host device during a second access period, and the apparatus is configured to transfer a second data set between the third bank of the first bank cluster and the bank of the first bank cluster that is not addressed by the host device.

14. The apparatus of claim 11, wherein the different storage location comprises the buffer.

15. The apparatus of claim 14, wherein the apparatus is configured to transfer a second data set from the buffer to the first bank of the first bank cluster during a second access period while the second bank of the first bank cluster is accessed in response to an access command during the second access period.

16. The apparatus of claim 15, wherein the apparatus is configured to perform the data migration operation during the access period, the second access period, or both.

17. The apparatus of claim 14, further comprising:

a third bank of the first bank cluster, wherein the apparatus is configured to transfer a second data set from the buffer to the third bank of the first bank cluster during a second access period, wherein any of the first bank, the second bank, or a fourth bank of the first bank cluster is accessed in response to an access command, during the second access period.

18. The apparatus of claim 11, further comprising:

a second bank cluster configured to receive a second data set of the first bank cluster.

19. The apparatus of claim 11, further comprising:

a fourth bank of a second bank cluster; and a fifth bank of the second bank cluster, wherein the apparatus is configured to migrate a second data set to the buffer during the access period and the apparatus is configured to migrate the second data set to the fourth bank of the second bank cluster during a second access period, while the fifth bank of the second bank cluster is accessed in response to an access command during the second access period.

* * * * *